United States Patent Office 3,531,493
Patented Sept. 29, 1970

3,531,493
DIPHENYLAMINE DERIVATIVES
Maurice Ward Gittos and John Williams James, Buckinghamshire, England, assignors to Aspro-Nicholas Limited, a British company
No Drawing. Filed Jan. 11, 1967, Ser. No. 608,518
Claims priority, application Great Britain, Jan. 15, 1966, 2,004/66
Int. Cl. C07c *101/54*
U.S. Cl. 260—307                                    4 Claims

ABSTRACT OF THE DISCLOSURE

A group of new compounds comprising N-(2,3,5,6-tetrafluorophenyl) anthranilic acid and certain derivatives thereof, mainly esters, are provided. These compounds have a low toxicity and display anti-inflammatory and analgesic activity. The free acid has an anti-inflammatory activity at least as great as indomethacin. The other compounds achieve a similar degree of activity after continued dosage. The preferred formulations are dosage unit forms containing from 10 to 250 mg. of the active compound. Pharmacologically active ingredients may be included in these formulations.

---

This invention relates to pharmaceutically useful derivatives of diphenylamine, to pharmaceutical formulations containing said derivatives and to methods of treatment involving the administration of said derivatives and compostions. The invention further relates to processes for manufacturing said diphenylamine derivatives.

The derivatives of diphenylamine according to the invention are represented by the general formula:

$$\text{Structure I}$$

wherein $R_1$ represents 1,3,4-oxadiazol-2-one, 1,2,4-triazol-3-one, tetrazol, or $COOR_2$ wherein $R_2$ represents a hydrogen atom or lower alkyl.

When $R_2$ in Formula 1 represents a hydrogen atom, the invention also provides salts, including ion-exchange resin salts, of the compound of Formula I.

The invention is especially concerned with compounds of Formula I in which $R_2$ is a hydrogen atom; a straight or branched chain lower alkyl group containing up to 4 carbon atoms.

Among the compounds of the foregoing class with which the invention is especially concerned are the compounds of Formula I in which $R_2$ is a hydrogen atom; methyl, ethyl propyl, butyl.

The term "lower" in qualifying various groups is used herein to mean those groups containing up to 4 carbon atoms.

Specific examples of preferred compounds of the present invention are:

N-(2,3,5,6-tetrafluorophenyl) anthranilic acid,
Methyl N-(2,3,5,6-tetrafluorophenyl) anthranilate,
Ethyl N-(2,3,5,6-tetrafluorophenyl) anthranilate,
t.-Butyl N-(2,3,5,6-tetrafluorophenyl) anthranilate,
o-(2′,3′,5′,6′-tetrafluoroanilino)-5-phenyl-1,3,4-oxadiazol-2-one.

The present invention further provides methods of making the compounds of Formula I characterised in that, by methods known per se.

(1) A benzoic acid derivative of Formula II is reacted with a polyfluorobenzene compound of Formula III:

$$\text{Structure II} \qquad \text{Structure III}$$

wherein $R_2$ is as defined in Formula I, and X and Y are amino, alkylsulphonyl or arylsulphonyl groups or halogen atoms, provided that at least one, but not both, of X and Y is an amino group, in the presence of acid acceptor such as a tertiary amine, for example, triethylamine, and a catalyst such as, for example, copper, copper bronze or a copper salt.

Advantageously the reaction between the compounds of Formula II and Formula III is carried out at a temperature of from 40–160° C., more preferably from 70–120° C., for a period of from 1 to 24 hours, more preferably from 2 to 10 hours;

(2) A compound of the formula:

$$\text{Structure IV}$$

or an ester thereof, wherein $R_5$ is hydrogen or $SO_3H$, $R_3$ is CN, COOH or COX in which X is an alkoxy, aralkoxy, amidino or amino group, $R_4$ is H or a group removable by acid such as, for example, an acyl group or COX where COX is as defined above, and $n$ is 0 or 1, provided that when $R_5$ is H, then $n$ must be 1; is heated with an aqueous mineral acid such as, for example, concentrated HCl or 30% (wt.) $H_2SO_4$.

The compounds of Formula IV may themselves be prepared by reacting a compound for Formula V with a compound of Formula VI:

$$\text{Structure V} \qquad \text{Structure VI}$$

wherein $R_3$, $R_5$ and $n$ are as defined in Formula IV and U and V are $NHR_4$ (where $R_4$ is as defined in Formula IV), alkylsulphonyl or arylsulphonyl groups or halogen atoms, provided that at least one, but not both, of U and V is a $NHR_4$ group, in the presence of an acid acceptor such as, for example, triethylamine, in the presence of a catalyst such as, for example, copper bronze, copper or a copper salt;

(3) An N-acylated anthranilic acid derivative of the formula:

$$\text{Structure VII}$$

wherein P represents a hydrogen atom or an organic radical such as, for example, lower alkyl and Ph represents an aryl radical, preferably phenyl or phenyl substituted by halogen, nitro, lower alkyl or lower alkoxy; is hydrolysed preferably in an alkaline medium by dissolving the starting material in a water-miscible inert organic solvent such as ethanol or methanol, adding a large excess of a concentrated aqueous solution of sodium or potassium hydroxide and allowing the hydrolysis to proceed, preferably at temperatures between 75 and 150° C., until the reaction is complete.

The compounds of Formula VII may themselves be prepared by reacting a benzimidoyl chloride of the formula:

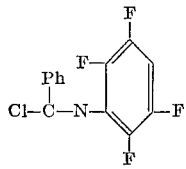

VIII wherein Ph is as defined in Formula VII, with a salicylate of the formula:

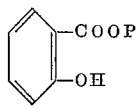

IX or an alkali metal salt thereof, wherein P is as defined in Formula VII, to yield an imidoester of the formula:

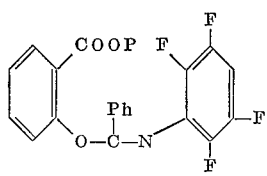

X wherein P and Ph are as defined in Formula VII, and thereafter heating said imidoester to cause an intramolecular rearrangement whilst optionally subjecting the reaction mixture to mild hydrolysis preferably in a basic medium to yield the desired compound of Formula VII;

(4) A compound of the formula:

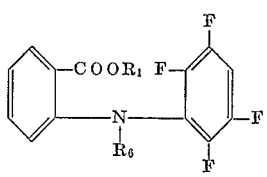

XI wherein $R_7$ is a hydrogen atom or a t.-alkyl group, preferably t.-butyl or t.-amyl and $R_6$ is a hydrogen atom or a CHO or CO.COOH group, provided that $R_7$ and $R_6$ are not both hydrogen; is thermally decomposed, in the presence or absence of a solvent.

Suitable solvents are water, biphenyl, diphenylether, benzene, toluene or mixtures thereof and the reaction is preferably carried out at 90–200° C., and preferably under acidic conditions and with an acid catalyst such as, for example, p-toluenesulphonic acid.

The compounds of Formula XI wherein $R_7$ is a hydrogen atom and $R_6$ is an CO.COOH group can be prepared by reacting a compound of the formula:

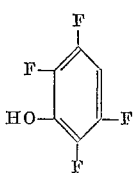

XII with a 2-haloquinoline in an inert solvent such as, for example, dimethylformamide or ethylene glycol dimethyl ether, to yield a 2-phenoxyquinoline of the formula:

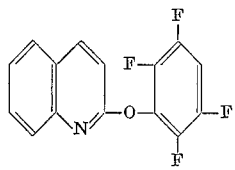

XIII and thereafter heating the compound of Formula XIII to cause an intramolecular rearrangement which results in the formation of a N-fluorophenyl carbostyryl of the formula:

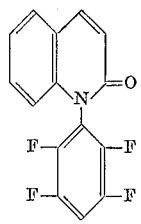

XIV

The compound of Formula XIV is then oxidised with a suitable oxidant such as, for example, $KMnO_4$, to yield the desired compound of Formula XI:

(5) A compound of the formula:

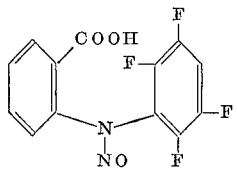

XV or salts thereof is heated in the presence of a hydroxylic solvent such as, for example, water or a lower alcohol; or in the presence of a hydrogen halide with or without another mineral acid; or in the presence of a nitrous acid decomposing agent such as, for example, urea, sulphamic acid or a primary amine.

The compounds of Formula XV may be prepared by reacting a hydrazine of the formula:

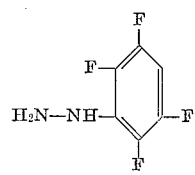

XVI with o-nitrobenzoyl chloride to yield an o-nitrobenzoic acid fluorophenyl hydrazide of the formula:

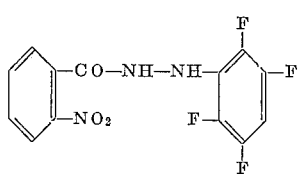

XVII treating said hydrazide with an aqueous solution of ammonium sulphide to yield a compound of the formula:

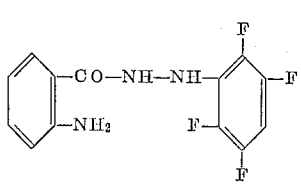

XVIII and thereafter converting the compound of Formula XVIII to a 1-fluorophenyl indazolone by treatment with nitrous acid and oxidising the said indazolone with, for example, potassium permanganate, to yield the desired compound of Formula XV;

(6) A compound of the formula:

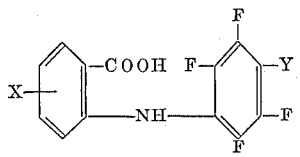

XIX wherein X is a hydrogen atom or an amino group in the 4-, 5- or 6-position relative to the COOH; Y is an amino group or a hydrogen atom, at least one of X or Y being an amino group; is reacted with nitrous acid under acidic conditions and the resulting diazonium compound is reacted, without isolation or purification, with hypophosphorous acid under acidic aqueous conditions.

The compound of Formula XIX may be prepared by reacting a benzoic acid derivative of the formula:

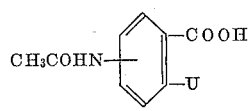

XX with a fluorobenzene derivative of formula:

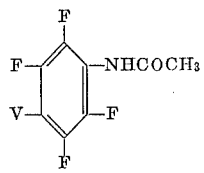

XXI wherein U and V are amino, alkylsulphonyl or arylsulphonyl groups or halogen atoms, provided that at least one, but not both, of U and V is an amino group, in the presence of an acid acceptor such as, for example, triethylamine, together with a copper catalyst;

(7) A compound of the formula:

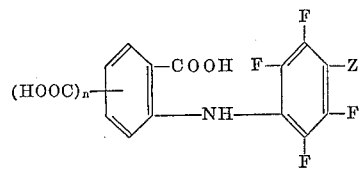

XXII wherein Z is COOH or hydrogen; $n$ is 0, 1 or 2 provided that when Z is hydrogen, $n$ must be 1 or 2; is selectively decarboxylated by heating the compound of Formula XXII or its monocarboxylic acid salt at 180–250° C. in an inert solvent such as, for example, quinoline, N:N-dimethylaniline or a mineral oil, preferably together with a copper containing catalyst.

The compounds of Formula XXII can be prepared by reacting a compound of the formula:

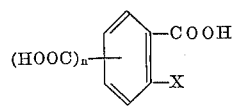

XXIII with a compound of the formula:

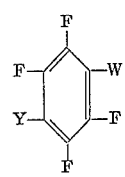

XXIV wherein $n$ is as defined in Formula XXII; W represents Z as defined in Formula XXII or a group hydrolysable to COOH such as, for example, COOalkyl; and X and Y are amino, alkyl sulphonyl or aryl sulphonyl groups or halogen atoms, provided that at least one, but not both, of X and Y is an amino group, in the presence of an acid acceptor such as, for example, triethylamine, together with a copper containing catalyst;

(8) An amide of the formula:

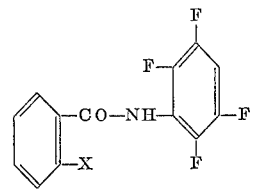

XXV wherein X is a halogen atom, is heated with an alkali, alkaline earth base, or a tertiary amine in the presence of a catalytic amount of water and a copper containing catalyst.

The compounds of Formula XXV can be prepared by reacting an o-halobenzoyl chloride with a compound of the formula:

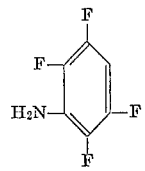

XXVI (9) A compound of the formula:

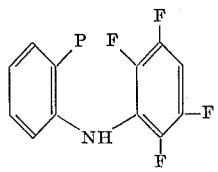

XXVII wherein P is a group oxidisable to COOH, is subjected to oxidation.

P may be, for example, vinyl or $\beta$-methylvinyl which is preferably oxidised by ozone followed by $H_2O_2$ and formic acid; or the group CO·COOH which is preferably oxidised by $H_2O_2$ in a basic medium; or formyl which is preferably oxidised by silver oxide or by oxygen and air; or hydroxymethyl which is preferably oxidised by potassium permanganate;

(10) A compound of the formula:

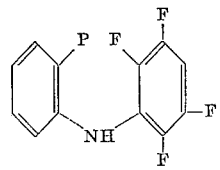

XXVIII wherein P is a group hydrolysable to COOH such as, for example, CN; COX where X is amino or substituted amino, $NHNH_2$, NHOH, C (Halogen)$_3$, alkoxy, aryloxy, aralkoxy, or X is

where Y is amino, halogen, alkoxy or C(Halogen)$_3$· is subjected to hydrolysis; or

(11) A compound of the formula:

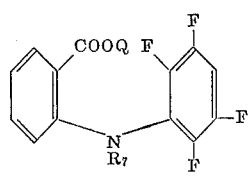

XXIX wherein Q is a hydrogen atom or a group convertible to H by reduction such as, for example, benzyl, substituted benzyl or a salt-forming cation; and $R_7$ is a hydrogen atom or a group convertible to H by reduction such as, for example, benzyl, hydroxyl, halogenoamino, N-alkylaminomethyl, alkoxy, acyloxymethyl or substituted derivatives thereof; provided that Q and $R_7$ cannot both be a hydrogen atom and when $R_7$ is a hydrogen atom, Q cannot be a salt-forming cation; is reduced using, for example, hydrazine hydrate, or hydrogen together with a catalyst such as, for example, platinum, palladium or Raney Nickel; or

(12) A compound of the formula:

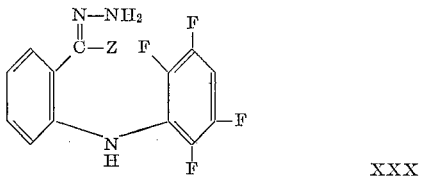

XXX wherein Z is hydroxy or amino, is reacted with phosgene in a suitable solvent such as toluene.

The compounds of Formula XXX can be prepared by reacting a compound of the formula:

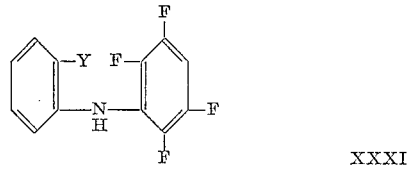

XXXI wherein Y is CN or $COOR_2$ wherein $R_2$ is as defined in formula I other hydrogen, with hydrazine hydrate in the presence of a suitable solvent such as, for example, n.-butanol; or

(13) A compound of the formula:

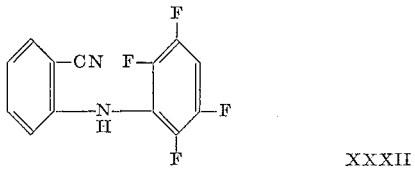

XXXII is reacted with an azide or hydrazoic acid in the presence or absence of a Lewis acid as catalyst in a liquid medium.

The compounds of Formula XXXII may be prepared by dehydrating the corresponding amide using, for example, phosphorus pentoxide or oxychloride, or thionyl chloride. The amide may be prepared from the corresponding ester by reaction with ammonia; and Thereafter where a compound of Formula I is required wherein $R_2$ is not a hydrogen atom and such a compound has not been obtained by any of the foregoing methods, the corresponding compound of Formula I in which $R_2$ is a hydrogen atom may be esterified using a method such as, for example:

(a) Reacting the acid of Formula I, in the presence of an acid catalyst such as, for example, sulphuric acid or hydrogen chloride, or the corresponding acid chloride, with an alcohol of the formula $R_2OH$ wherein $R_2$ is as defined in Formula I, other than a hydrogen atom or a salt of that alcohol when $R_2$ contains a basic nitrogen atom; or (b) Reacting the acid of Formula I with a halide of the formula $R_2X$ wherein $R_2$ is as defined in (a) above, and X is a halogen atom, or a salt of that halide when $R_2$ contains a basic nitrogen atom, in the presence of an acid acceptor such as, for example, triethylamine or an alkali metal carbonate.

As previously indicated, the present invention also provides salts of the compound of Formula I wherein $R_1$ represents $COOR_2$ and $R_2$ is a hydrogen atom. The free acid may be converted into such a salt according to known methods, for example, by reacting the acid, preferably a solution thereof in a solvent or solvent mixture, with the appropriate base or a solution thereof, or with a cationic exchange preparation and isolating the desired salt, which may be obtained in the form of a hydrate or may contain solvent of crystallization.

Salts of the free acid of Formula I comprise especially the pharmaceutically acceptable, non-toxic salts with suitable bases, such as those with a hydroxide, for example ammonium hydroxide or an alkyl ammonium, aralkylammonium, alkali metal or alkaline earth metal hydroxide, for example, lithium hydroxide, sodium hydroxide, potassium hydroxide, calcium hydroxide, benzyltrimethyl ammonium hydroxide, tetramethylammonium-, tetraethylammonium-, tetrabutylammonium hydroxide or choline hydroxide; with a carbonate, such as an alkali metal or an alkaline earth metal carbonate or hydrogen carbonate, for example, sodium, potassium, or calcium carbonate or hydrogen carbonate; or with a hydroxyl ion exchange preparation, or with any other suitable reagent. Apart from pharmaceutically acceptable salts, other salts are also included with the scope of salts of the free acid of Formula I; they may serve as intermediates in the purification of the acid or in the preparation of other, for example, pharmaceutically acceptable salts, or are useful for identification, characterization or purification of the acid.

A resulting basic salt may be converted into the free acid according to known methods, for example, by treating it with an acid, such as an inorganic acid, for example, hydrochloric, hydrobromic, nitric, sulphuric or phosphoric acid. A resulting basic salt may also be converted into another basic salt by known methods; for example, a silver salt may be treated with a metal or quaternary ammonium salt, for example sodium, barium or a choline salt in a suitable diluent, in which the resulting silver salt is insoluble and is thus removed from the reaction medium; or a basic salt may be converted to another basic salt be treatment with a cation exchange preparation.

Resin salts of the free acid of Formula I may be obtained by contacting an anion exchange material with a solution in an inert, preferably polar, solvent of the acid until the desired degree of saturation, usually substantially complete saturation, of the exchange material with the acid has taken place. Suitable anion exchange resins for this purpose are the hydroxy forms of those known by the trade name DeAcidite FF, Amberlite IRA–400, Dowex 1 and Dowex 2 (the words "DeAcidite" and "Amberlite" are registered trademarks in the United Kingdom).

It has been found in accordance with the present invention that the compound of Formula I in which $R_1$ represents $COOR_2$ and $R_2$ is hydrogen possesses a valuable and powerful anti-inflammatory action and a useful analgesic action. The anti-inflammatory activity of N(2,3,5,6-tetrafluorophenyl) anthranilic acid has been found to be more ten times greater than that of flufenamic acid and at least as active as indomethacin in the U.V. erythema test described by Winder et al. in Arch. Int. Pharmacodyn., 1958, CXVI, No. 3 to 4, pages 261 to 292.

It has also been found that the other compounds of Formula I possess similar anti-inflammatory activity but that that activity is achieved at higher dosage levels than those for the free acid. However it has surprisingly been found by the applicants that with continued dosage at dosage levels as low or nearly as low as for the free acid, the activity of these other compounds may be increased to a level comparable with that of the free acid. This feature of increased activity after prolonged dosage may be particularly important where long term therapy is required or is desirable. According, therefore, to a further feature of the present invention there is provided a method of treatment of a subject suffering inflammation and/or pain comprising administering to said subject an effective dose or doses of one or more of the compounds of Formula I.

Although a larger number of derivatives of anthranilic acid are known or have been found by the applicants to have anti-inflammatory activity, it is particularly surprising and unexpected how great an increase in activity is achieved by substituting the nitrogen atom of anthranilic acid with a 2,3,5,6-tetrafluorophenyl group. In Part I of Table I below, the anti-inflammatory activity (expressed as a $PD_{50}$), in the U.V. erythema test mentioned above, of N - (2,3,5,6 - tetrafluorophenyl) anthranilic acid and numerous closely related compounds is set out, together with the $LD_{50}$ of each compound. The $PD_{50}$ is the dose at which the summed erythema scores are half those of untreated control animals. The U.V. erythema test was carried out in guinea pigs and the $LD_{50}$'s were determined in mice. In Part II of Table I, comparative figures for two compounds known and used for their powerful anti-inflammatory activity in humans are given. In Part III of Table I are given two $PD_{50}$'s for an ester of Formula I, the first figure being obtained as for the other compounds in Table I whilst the second figure was obtained after a period of 10 days during which the guinea pigs were dosed with the stated compound once per day and the test was carried out after the 10th dose.

TABLE I

| Compound | $PD_{50}$ p.o. (mg./kg.) | $LD_{50}$ i.p. (mg./kg.) |
|---|---|---|
| Part 1: | | |
| N-(4-fluorophenyl) anthranilic acid | 64 | 220 |
| N-(2,5-difluorophenyl) anthranilic acid | 16 | >512 |
| N-(2,3,6-trifluorophenyl) anthranilic acid | 6 | >512 |
| N-(2,3,5-trifluorophenyl) anthranilic acid | 8 | >512 |
| N-pentafluorophenyl anthranilic acid | 12 | 150 |
| N-(2,3,4,6-tetrafluorophenyl) anthranilic acid | 50 | 350 |
| N-(2,3,4,5-tetrafluorophenyl) anthranilic acid | 64 | 180 |
| N-(4-methyl-2,3,5,6,tetrafluorophenyl) anthranilic acid | 16 | 350 |
| N-(4-trifluoromethyl-2,3,5,6,-tetrafluorophenyl) anthranilic acid | 32 | 480 |
| N-(2,3-Dimethylphenyl) anthranilic acid | 16 | 480 |
| N-(2,3,5,6-tetrachlorophenyl) anthranilic acid | 5 | 450 |
| N-(2,3,5,6-tetrafluorophenyl) anthranilic acid | 0.5 | >512 |
| Part 2: | | |
| Flufenamic acid | 11 | 350 |
| Indomethacin | 1.0 | 170 |
| Part 3: | | |
| Methyl N-(2,3,5,6-tetrafluorophenyl) anthranilate | 16 | >512 |
| Methyl N-(2,3,5,6-tetrafluorophenyl) anthranilate after dosing for 10 days | 1.0 | |

The analgestic activity of N-(2,3,5,6-tetrafluorophenyl) anthranilic acid was ascertained using the method of Siegmund, Cadmus and Lu, Proc. Soc. Exp. Biol. N.Y., 95, 729 (1957). Briefly, in this test, mice are injected with a dose of the test compound and the inhibition of writhing caused by the injection of phenylbenzoquinone 25 minutes later is measured. The activity, designated $P.D._{50}$, of the test compound is expressed as the dose required to reduce the amount of writhing by 50% compared with a control group of mice. In Table II below, the analgesic activity of N-(2,3,5,6-tetrafluorophenyl)anthranilic acid is compared with a number of well known other analgesics.

TABLE II

| Compound: | $P.D._{50}$ (mg./kg.) |
|---|---|
| N-(2,3,5,6-tetrafluorophenyl)anthranilic acid | 22 |
| Codeine | 5 |
| Amidopyrine | 30 |
| Phenylbutazone | 83 |
| Phenacetin | 140 |

It can thus be seen that N-(2,3,5,6-tetrafluorophenyl) anthranilic acid has an analgesic activity of such an order as to make it a useful drug in the so-called "non-narcotic analgesic" field.

The present invention further provides pharmaceutical formulations comprising as an essential ingredient at least one compound of Formula I in association with at least one pharmaceutically acceptable diluent or carrier therefor.

The compounds or formulations of the present invention are preferably administered orally, parenterally or rectally in the form of, for example, tablets, capsules, suppositories or suspensions. Advantageously for this purpose, formulations may be provided in dosage unit form, preferably each dosage unit containing from 1 to 1000 mg., more advantageously from 5 to 500 mg., and most advantageously from 10 to 250 mg. of a compound of Formula I.

In this specification the expression "dosage unit form" is used as meaning a physically discrete unit containing an individual quantity of the active ingredient, generally in admixture with a pharmaceutical diluent therefore or otherwise in association with a pharmaceutical carrier, the quantity of the active ingredient being such that one or more units are normally required for a single therapeutic administration or that, in the case of severable units such as scored tablets, at least one fraction such as a half or a quarter of a severable unit is required for a single therapeutic administration.

The formulations of the present invention normally will consist of at least one compound of Formula I mixed with a carrier, or diluted by a carrier, or enclosed or encapsulated by a carrier in the form of a capsule, sachet, cachet, paper or other container. A carrier or diluent may be a solid, semi-solid or liquid material which serves as a vehicle, excipient or medium for the active therapeutic substance. Some examples of the diluents or carriers which may be employed in the pharmaceutical formulations of the present invention are lactose, dextrose, sucrose, sorbitol, mannitol, starch, gum acacia, calcium phosphate, liquid paraffin, cocoa butter, oil of theobroma, alginates, tragacanth, gelatin, syrup B.P., methyl cellulose, polyoxyethylene sorbitan monolaurate, and methyl- and propyl-hydroxybenzoate. In the case of tablets, a lubricant may be incorporated to prevent sticking and binding of the powdered ingredients in the dies and on the punch of the tabletting machine. For such purpose, there may be employed for instance talc, aluminum, magnesium or calcium stearate or mineral oil.

The pharmaceutical formulations of the present invention may contain, in addition to the active ingredient of Formula I, one or more other pharmacologically active ingredients, for example, acetylsalicylic acid, aspirin anhydride, 1:3-benzoxazine - 2:4 - dione, 3-methylsalicylic acid, an aluminum aspirin compound (for example aloxiprin), caffeine, codeine phosphate, phenazone, paracetamol, amidopyrine, phenylbutazone, salicylamides, alkoxy ($C_{1-4}$) nuclear-substituted derivatives of salicylamide or toluamide, and alkoxy and alkoxyalkyl nuclear substituted derivatives of benzamide.

The following examples will further illustrate the invention:

EXAMPLE 1

N-(2,3,5,6-tetrafluorophenyl) anthranilic acid
(Code No. 1784)

A stirred mixture of o-chlorobenzoic acid (7.8 g., 0.5 mole), triethylamine (5.3 g., 0.05 mole), 2,3,5,6-tetrafluoroaniline (5.75 g., 0.05 mole) and finely divided copper bronze (1 g.) was heated at 90–100° C. for 3 hours. Dilute hydrochloric acid (30 ml., 2 N) was added to the cooled mixture, the solid filtered off and suspended in water (100 ml.). Dilute sodium hydroxide (2 N) was added until the solid had almost completely dissolved (the pH of the solution being between 9 and 10), the solution shaken with animal charcoal, filtered and acidified with dilute hydrochloric acid (5 N). The precipitated solid was recrystallised from methanol to yield crystals of N-(2,3,5,6-tetrafluorophenyl) anthranilic acid, M.P. 256–8° C.

EXAMPLE 2

Methyl N-(2,3,5,6-tetrafluorophenyl) anthranilate
(Code No. 1829)

A mixture of N-(2,3,5,6-tetrafluorophenyl) anthranilic acid (3.7 g.), potassium carbonate (4.5 g.), methyl iodide (7.4 mls.) and anhydrous methanol (148 ml.) was boiled under reflux for 2 hours, cooled, methyl iodide (14.8 ml.)

added and the mixture stirred at room temperature for one hour. The mixture was poured into water and the organic material which separated was extracted into ether. Evaporation of the dried ether extract and crystallisation of the solid from aqueous methanol gave methyl N-(2,3,5,6-tetrafluorophenyl) anthranilate, M.P. 119–121° C.

EXAMPLE 3

Ethyl N-(2,3,5,6-tetrafluorophenyl) anthranilate Code No. 2018)

Thionyl chloride (6.26 g.) was slowly added to a stirred mixture of N-(2,3,5,6-tetrafluorophenyl) anthranilic acid (15 g.) and dry benzene (50 mls.). The mixture was then refluxed for 2 hours and evaporated to dryness under reduced pressure. The resulting residue of N-(2,3,5,6-tetrafluorophenyl) anthraniloyl chloride was treated with dry ethanol (50 mls.) and the mixture refluxed for an hour. The excess ethanol was removed by distillation under reduced pressure and the residue recrystallised from aqueous ethanol to give ethyl N-(2,3,5,6-tetrafluorophenyl) anthranilate, M.P. 100–2° C.

EXAMPLE 4

Tables each containing 100 mg. of Compound 1829 are made as follows:

| | Mg. |
|---|---|
| Compound 1829 | 100 |
| Potato starch | 38 |
| Lactose | 25 |
| Ethyl cellulose (as 20% solution in industrial alcohol) | 2 |
| Alginic acid | 7 |
| Magnesium stearate | 1 |
| Talc | 2 |
| Total | 175 |

The Compound 1829, starch and lactose are passed through a No. 44 mesh B.S.S. sieve and mixed thoroughly. The solution of ethyl cellulose is mixed with the resultant powders which are then passed through a No. 12 mesh B.S.S. sieve. The granules produced are dried at 50–60° C. and then passed through a No. 16 mesh B.S.S. sieve. The alginic acid, magnesium stearate and talc, previously passed through a No. 60 mesh B.S.S. sieve, are added to the granules, mixed and compressed in a tabletting machine to yield tablets each weighing 175 mg.

EXAMPLE 5

Capsules each containing 200 mg. of Compound 1829 are made as follows:

| | Mg. |
|---|---|
| Compound 1829 | 200 |
| Lactose | 48 |
| Magnesium stearate | 2 |

The Compound 1829, lactose and magnesium stearate are passed through a No. 44 mesh B.S.S. sieve and filled into hard gelatin capsules in 250 mg. quantities.

EXAMPLE 6

Injection solutions each containing 100 mg. of Compound 1829 per 5 ml. solution are made as follows:

Compound 1829—100 mg.
Sodium hydroxide (10% solution)—Q.s.
Water for injection—to 5 ml.

The Compound 1829 is suspended in the water and the sodium hydroxide solution added drop by drop with stirring until the Compound 1829 is in solution. The pH of the solution is adjusted to between 8.0 and 8.5, the solution is sterilised by filtration through a bacteria-proof filter and filled into previously sterilised glass ampoules which are then hermetically sealed under aseptic conditions.

EXAMPLE 7

Suppositories each containing 250 mg. of Compound 1829 are made as follows:

| | Mg. |
|---|---|
| Compound 1829 | 250 |
| Theobroma Oil | to 2000 |

The Compound 1829 is passed through a No. 60 mesh B.S.S. sieve and suspended in the theobroma oil previously melted using the minimum of heat necessary. The mixture is then poured into a suppository mould of nominal 2 g. capacity and allowed to cool.

EXAMPLE 8

Tablets each containing 10 mg. of Compound 1784 are made as follows:

| | Mg. |
|---|---|
| Compound 1784 | 10 |
| Lactose | 187.5 |
| Maize starch (i) | 20 |
| Maize starch as 1 in 10 paste (ii) | 10 |
| Maize starch (iii) | 10 |
| Magnesium stearate | 2.5 |
| Total | 240 |

The Compound 1784, lactose and starch (i) are passed through a No. 44 mesh B.S.S. sieve and mixed thoroughly. The starch paste (ii) is used to granulate the mixture which is passed through a No. 12 mesh B.S.S. sieve. The granules are dried at 40° C. and passed through a No. 16 mesh B.S.S. sieve. The starch (iii) and the magnesium stearate, previously passed through a No. 60 mesh B.S.S. sieve, are added to the granules and mixed thoroughly. The granules are then compressed to a tablet weight of 240 mg.

EXAMPLE 9

Capsules each containing 22 mg. of Compound 1784 are made as follows:

| | Mg. |
|---|---|
| Compound 1784 | 20 |
| Lactose | 129 |
| Magnesium stearate | 1 |

The Compound 1784, lactose and magnesium stearate are passed through a No. 44 mesh B.S.S. sieve and filled into hard gelatin capsules in 150 mg. quantities.

EXAMPLE 10

Injection solutions each containing 10 mg. of Compound 1784 per ml. solution are made as follows:

Compound 1784—10 mg.
Sodium hydroxide (10% solution)—Q.s.
Water for injection—To 1.0 ml.

The Compound 1784 is suspended in the water and sodium hydroxide solution added drop by drop with stirring until the Compound 1784 is in solution, the pH being adjusted to between 80 and 8.5. The solution is then sterilised by filtration through a bacteria-proof filter and filled into previously sterilised glass ampoules which are then hermetically sealed under aseptic conditions.

EXAMPLE 11

Suppositories each containing 20 mg. of Compound 1784 are made as follows:

| | Mg. |
|---|---|
| Compound 1784 | 20 |
| Theobroma oil | to 100 |

The compound 1784 is passed through a No. 60 mesh B.S.S. sieve and suspended in the theobroma oil previously melted using the minimum amount of heat necessary. The mixture is then poured into a suppository mould of nominal 1 g. capacity and allowed to cool.

In the foregoing Examples 4 to 11, the active compounds used may, in accordance with the invention, be replaced wholly or in part by other active compounds of Formula I.

EXAMPLE 12 o-2', 3', 5', 6'-tetrafluoroanilino)-5-phenyl-1,3,4-oxadiazol-2-one

A mixture of hydrazine hydrate (0.7 g.), methyl N-(2,3,5,6-tetrafluorophenyl) anthranilate and n.-butanol was refluxed for 3 hours. The butanol was distilled off under reduced pressure and the solid residue recrystallised from methanol to give 2,3,5,6-tetrafluorophenyl anthranilic hydrazide (3.5 g.), M.P. 161–166° C.

The hydrazide (5.3 g.) was dissolved in warm glacial acetic acid (100 ml.), the solution cooled to 0° C. and then treated with a solution of phosgene in toluene (19.2 ml. of a 12½% w./w). After leaving to stand at room temperature overnight, the mixture was evaporated to dryness under reduced pressure and the residue recrystallised from ethanol to give o-(2',3',5',6'-tetrafluoroanilino)-5-phenyl-1,3,4-oxadiazol-2-one, M.P. 252–6° C.

Having regard to the foregoing disclosure, the following is claimed as the inventive and patentable embodiments thereof:

1. A diphenylamine derivative of the formula:

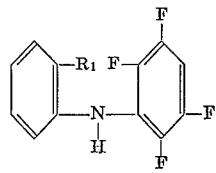

wherein $R_1$ is 1,3,4-oxadazol-2-one, 1,2,4-triazol-3-one, tetrazol, or $CCOR_2$ wherein $R_2$ is hydrogen or lower alkyl and nontoxic pharmaceutically acceptable salts thereof.

2. A diphenylamine derivative as claimed in claim 1, wherein $R_2$ is lower alkyl.

3. A diphenylamine derivative as claimed in claim 1, wherein $R_2$ is hydrogen.

4. A compound as claimed in claim 1, wherein $R_1$ is 1,3,4-oxadiazole-2-one or $COOR_2$ and $R_2$ is methyl or ethyl.

References Cited

UNITED STATES PATENTS 3,420,871  1/1969  Scherrer et al. _____ 260—472

LORRAINE A. WEINBERGER, Primary Examiner

L. A. THAXTON, Assistant Examiner

U.S. Cl. X.R.

260—289, 308, 465, 471, 501.13, 507, 518, 558; 424—272, 273, 310, 316, 319

UNITED STATES PATENT OFFICE
CERTIFICATE OF CORRECTION

Patent No. 3,531,493                    Dated September 29, 1970

Inventor(s) Maurice Ward Gittos and John Williams James

It is certified that error appears in the above-identified patent and that said Letters Patent are hereby corrected as shown below:

Column 1, line 13, "now" should be --new--; line 31, "compostions" should be --compositions--. Column 2, Formula VII, lines 60 to 66, that portion of the formula reading

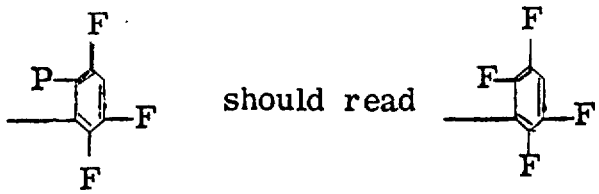

Column 3, Formula XI, lines 45 to 53, that portion of the formula reading

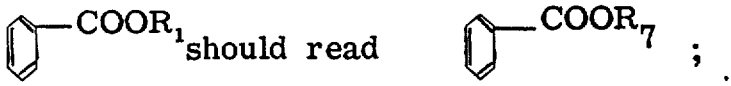

Column 3, line 54, "allkyl" should be --alkyl--. Column 8, line 73, "larger" should be --large--. Column 11, line 25, "Tables" should be --Tablets--. Column 12, line 42, "22" should be --20--. Column 14, line 9, "oxadazol" should be --oxadiazol--.

SIGNED AND
SEALED
DEC 15 1970

(SEAL)
Attest:

Edward M. Fletcher, Jr.
Attesting Officer

WILLIAM E. SCHUYLER, JR.
Commissioner of Patents

PO-1050
(5/69)

UNITED STATES PATENT OFFICE

SUPPLEMEN-TAL CERTIFICATE OF CORRECTION

Patent No. 3,531,493          Dated September 29, 1970

Inventor(s) Maurice Ward Gittos and John Williams James

It is certified that error appears in the above-identified patent and that said Letters Patent are hereby corrected as shown below:

Column 14, line 10, : "$CCOR_2$" should be -- $COOR_2$ --
Claim 1

Signed and sealed this 22nd day of May 1973.

(SEAL)
Attest:

EDWARD M. FLETCHER, JR.
Attesting Officer

ROBERT GOTTSCHALK
Commissioner of Patents